Patented Aug. 25, 1931

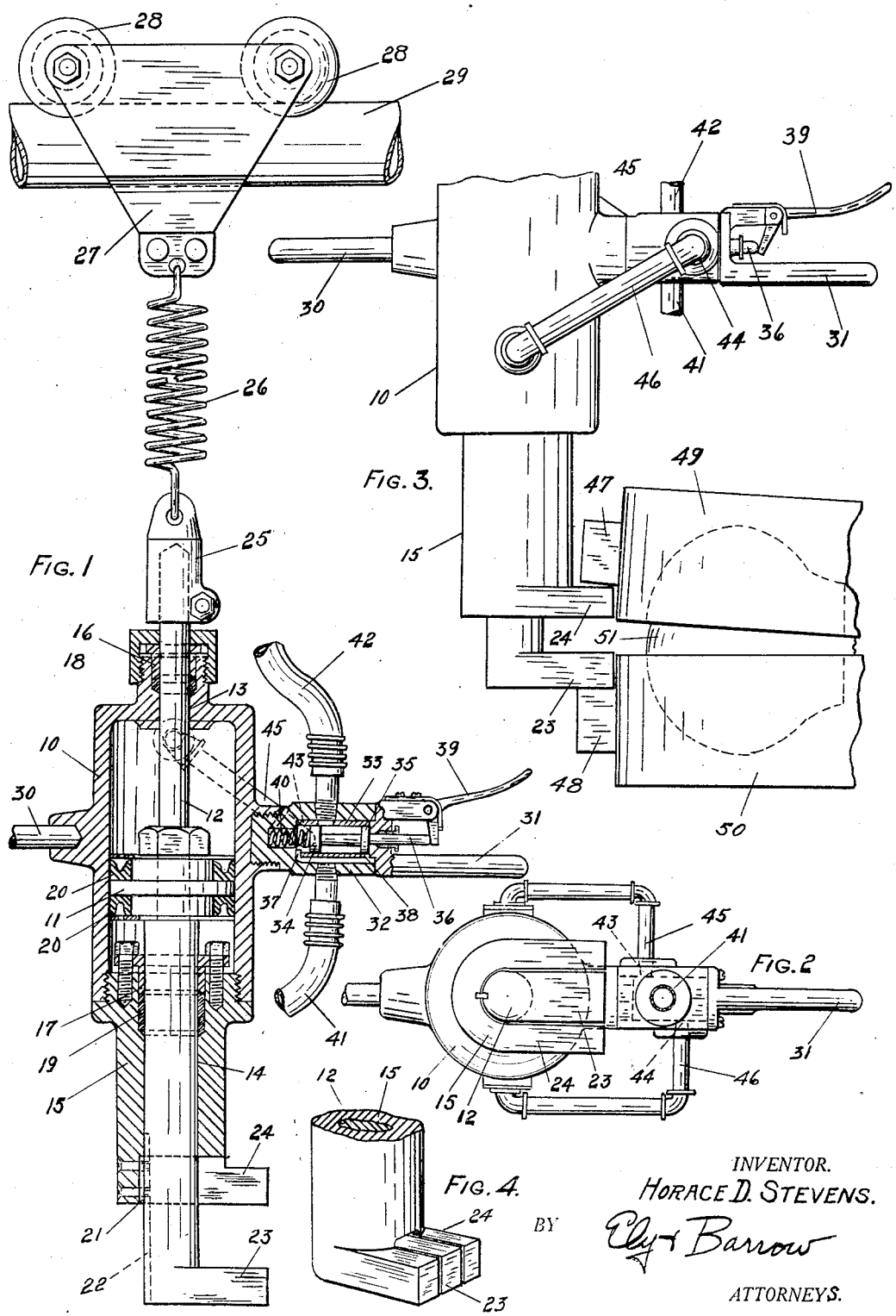

1,820,892

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

TIRE MOLD OPENER

Application filed December 3, 1926. Serial No. 152,378.

This invention relates to devices for opening the molds used in the vulcanization of rubber tires.

The general purpose of the invention is to provide a machine for separating tire mold halves in a rapid and effective manner and with a minimum of manual labor. The tire mold sections which are tightly clamped about the tire during the vulcanizing operation, are difficult to separate and heretofore it has been the practice to wedge a crow-bar between lugs on the mold halves and exert considerable pressure thereon to open the mold manually. It is an object of this invention to provide a fluid-operated device for opening tire molds, whereby all of the heavy manual labor required in this operation will be eliminated. A further object is to provide a readily portable and easily manipulated device for separating tire mold halves.

The foregoing and other objects are obtained by the device illustrated in the accompanying drawings and described below. It is to be understood that the device is not limited to use in opening mold halves, but may be employed in any instance where relatively adjacent members are to be separated. It is also to be understood that the invention is not limited to the specific form thereof disclosed herein.

Of the accompanying drawings:

Figure 1 is a vertical section of a device embodying the invention;

Figure 2 is a plan thereof as viewed from below;

Figure 3 is a front elevation of the device in position for opening a tire mold; and Figure 4 is a perspective detail of the foot portions of the device in closed condition.

Referring more particularly to the drawings, 10 indicates generally a double-acting fluid operated cylinder having mounted therein a reciprocable piston 11 attached to a piston rod 12. The piston rod extends from both sides of the piston, the upper portion being slidable through bearing 13 in the top of cylinder 10 and the lower end being slidable through an extended bearing 14 on plug member 15 threaded onto the lower end of cylinder 10. Glands 16 and 17, and packings 18 and 19 are provided at the upper and lower bearings respectively, for the prevention of leakage around the piston rod. Leakage past the piston is prevented by pressure packing gaskets 20, 20 mounted on both sides thereof. A key 21 on member 15 slides in a key way 22 in piston rod 12 to prevent the relative rotation of these parts. Piston rod 12 and member 15 are formed with sidewardly extending foot portions 23 and 24, respectively, foot portion 24 having a U-shaped form as viewed from below (Fig. 2) and foot portion 23 being adapted to fit into the opening between the sides of foot portion 24 when piston rod 12 is in its uppermost position (Fig. 4).

The upper end of piston rod 12 acts as a support for the device and has attached thereto an eye member 25 suspended by a spring 26. The spring in turn is attached to a carriage 27 having thereon rollers 28, 28 adapted to pass along a tubular track 29 to adjust the horizontal position of the cylinder. Handles 30 and 31 extend from the side of cylinder 10 for manipulating the device.

The piston is actuated by a fluid, preferably water, under a pressure of from 200 to 500 pounds per square inch, which fluid is controlled by a hand-operated valve mechanism, comprising a valve housing 32 attached to cylinder 10 and carrying a sleeve 33. Valves 34 and 35 carried by valve stem 36 are reciprocably mounted within sleeve 33 and are adapted alternately to close and open exhaust ports 37 and 38, respectively, in the ends of said sleeve. Valve stem 36 is operated by a hand lever 39 adjacent handle 31 and is normally held in its outward position by a spring 40. Ports 37 and 38 are connected to an exhaust hose line 41 attached to one side of housing 32, while a hydraulic pressure hose line 42 is attached to the other side of the housing and communicates alternately with side ports 43 and 44 as the valve stem is reciprocated. The latter ports are connected to the top and bottom of the cylinder by pipes 45 and 46 respectively, so that when lever 39 is pushed down as shown in Fig. 3, valve 34 moves over to close port 37 and open port 43 into communication with the pressure line, water entering the top of the cylinder to force piston 11 and piston rod 12 down and separate foot portions 23 and 24. At the same time valve 35 moves over to open exhaust port 38 into communication with port 44 to exhaust water from the lower end of the cylinder. When lever 39 is released as in Figure 1, the reverse cycle is carried out, water being forced into the lower end of the cylinder to bring together foot portions 23 and 24.

When the device is used for opening a tire mold, foot portions 23 and 24 in their closed position are placed between lugs 47 and 48 on the mold halves 49 and 50. Lever 39 is then pushed down to operate the cylinder and separate the foot portions whereby the mold will be opened and the finished tire 51 may be removed. Carriage 27 may be freely rolled along track 29 so that the device may be easily brought into operative position, proper vertical alignment being obtained by applying more or less tension on spring 26. Track 29 may be extended horizontally above and parallel to a conveyor track so that the device may be operated on and follow molds while the latter are moving along the conveyor.

Modifications of the invention may be resorted to, as will be understood, without departing from the spirit thereof of the scope of the appended claims.

What is claimed is:

1. A device for separating tire molds, comprising a double acting hydraulic cylinder, a piston reciprocable therein, a piston rod extending from each side of said piston and attached thereto, a bearing at the top of the cylinder through which the upper piston rod passes, an extended base member projecting from the lower end of said cylinder, a bearing in said member through which the lower piston rod passes, sidewardly extending foot portions on the lower ends of said base portion and said lower piston rod, adapted to interfit when the piston is positioned at the top of the cylinder and to be separated when the piston is at the bottom of the cylinder, a helical spring attached to the upper end of said piston rod, a carriage member from which the cylinder is suspended by said spring for the vertical adjustment of the device, said carriage being adapted to travel horizontally for the lateral positioning of said device, and a hand-operated four-way valve having a reciprocable valve stem and suitable ports to admit water under pressure to the upper end of said cylinder and simultaneously exhaust water from the lower end and vice versa for relatively moving said foot portions.

2. A device for separating tire molds, comprising a double acting hydraulic cylinder, a piston reciprocable therein, a piston rod extending from each side of said piston and attached thereto, an extended base member projecting from the lower end of said cylinder, sidewardly extending foot portions on the lower ends of said base portion and said lower piston rod, adapted to interfit when the piston is positioned at the top of the cylinder and to be separated when the piston is at the bottom of the cylinder, a spring attached to the upper end of said piston rod, whereby the cylinder and foot portions may be supported at variable vertical heights, a carriage member from which the cylinder is suspended by said spring for the vertical adjustment of the device, said carriage being adapted to travel horizontally for the lateral positioning of said device, and means for admitting fluid pressure alternately to the opposite sides of the piston for relatively moving said foot portions.

HORACE D. STEVENS.